United States Patent
Roy (10) Patent No.: US 9,356,414 B2
(45) Date of Patent: May 31, 2016

(54) METHOD AND SYSTEM FOR PERFORMING AUTOMATIC GAS REFILLS FOR A GAS LASER

(71) Applicant: Teledyne Instruments, Inc., Thousand Oaks, CA (US)

(72) Inventor: John Roy, Rancho Sante Fe, CA (US)

(73) Assignee: TELEDYNE INSTRUMENTS, INC., Thousand Oaks, CA (US)

( * ) Notice: Subject to any disclaimer, the term of this patent is extended or adjusted under 35 U.S.C. 154(b) by 0 days.

(21) Appl. No.: 14/585,062

(22) Filed: Dec. 29, 2014

(65) Prior Publication Data

US 2015/0188278 A1 Jul. 2, 2015

Related U.S. Application Data (60) Provisional application No. 61/922,655, filed on Dec. 31, 2013.

(51) Int. Cl.
*H01S 3/22* (2006.01)
*H01S 3/036* (2006.01)
*H01S 3/225* (2006.01)

(52) U.S. Cl.
CPC ............... *H01S 3/036* (2013.01); *H01S 3/225* (2013.01)

(58) Field of Classification Search
CPC ...... H01S 3/036; H01S 3/10015; H01S 3/225
See application file for complete search history.

(56) References Cited

U.S. PATENT DOCUMENTS

| | | | | |
|---|---|---|---|---|
| 5,117,435 A | * | 5/1992 | Cook et al. | 372/59 |
| 6,128,323 A | * | 10/2000 | Myers et al. | 372/38.1 |
| 6,164,116 A | * | 12/2000 | Rice et al. | 73/1.72 |
| 6,727,731 B1 | | 4/2004 | Rebhan et al. | |
| 2008/0205472 A1 | | 8/2008 | Dunstan et al. | |
| 2013/0000773 A1 | | 1/2013 | Jiang et al. | |
| 2013/0083818 A1 | * | 4/2013 | Riggs | 372/59 |
| 2013/0100980 A1 | * | 4/2013 | Abe et al. | 372/57 |

FOREIGN PATENT DOCUMENTS

EP 1075060 A2 2/2001

OTHER PUBLICATIONS

International Search Report and Written Opinion of the International Searching Authority for International Application No. PCT/US2014/072605 mailed Apr. 24, 2015.

* cited by examiner

*Primary Examiner* — Yuanda Zhang
(74) *Attorney, Agent, or Firm* — K&L Gates LLP (57) ABSTRACT

An apparatus to automatically refill a gas laser is disclosed. The apparatus includes a computing device coupled to a memory. The memory storing instructions that when executed by the computing device cause the computing device to monitor a time elapsed since a last recorded gas refill and when a predetermined time interval is reached since the last recorded gas refill, effectuate a gas refill process to refill the gas laser with gas from a gas supply coupled to the gas laser by automatically controlling the gas laser and the gas supply; and upon completing the gas refill process, record a time stamp of the completed gas refill process. A method and system to automatically refill a gas laser also are disclosed.

23 Claims, 5 Drawing Sheets

METHOD AND SYSTEM FOR PERFORMING AUTOMATIC GAS REFILLS FOR A GAS LASER

CROSS-REFERENCE TO RELATED APPLICATIONS

This application claims the benefit of U.S. Provisional Patent Application Ser. No. 61/922,655 entitled "METHOD AND SYSTEM FOR PERFORMING AUTOMATIC GAS REFILLS FOR A GAS LASER," filed on Dec. 31, 2013, which is entirely incorporated herein by reference.

TECHNICAL FIELD

The subject matter described in this disclosure generally relates to systems, devices, and techniques for operating gas lasers. More specifically, the present disclosure provides a technique for refilling gas lasers, such as excimer gas lasers.

BACKGROUND

Excimer lasers use a variety of different gases as a lasing medium. These gases can include, but are not limited to, F2, ArF, KrF, XeBr, XeCl or XeF. Each type of these gases can emit specific wavelengths of light when used as a lasing medium. However, the ability of the gas to sustain the lasing process typically diminishes with use and, as a result, requires replacement with fresh gas routinely. Moreover, each of these gases has a "shelf life" such that the gas within an excimer laser becomes stale within a given period of time regardless whether the excimer laser has been actively used or not. Hence, it is necessary to replace the stale gas with fresh gas under such conditions.

SUMMARY

Techniques, systems, and devices are disclosed for performing an automatic gas refill of a gas laser without the need for user intervention.

In one aspect, a process for performing an automatic gas refill of a gas laser includes: monitoring a time elapsed since a last recorded gas refill; when a predetermined time interval is reached since the last recorded gas refill, effectuating a gas refill process to refill the gas laser with gas from a gas supply coupled to the gas laser by automatically controlling the gas laser and the gas supply; upon completing the gas refill process, recording a time stamp of the completed gas refill process.

In some implementations, the technique effectuates the gas refill process by powering up the gas laser electrically through an alternating current (AC) power switch.

In some implementations, the technique effectuates the gas refill process by opening a gas supply valve coupled to the gas supply to allow passage of gas from the gas supply to the gas laser.

In some implementations, the technique effectuates the gas refill process by initiating a gas refill routine which includes purging stale gas from the gas laser and filling fresh gas from the gas supply into the gas laser.

In some implementations, the gas laser is coupled to the gas supply external to the gas laser through one or more gas valves and one or more gas tubes.

In some implementations, the gas laser is an excimer laser.

In some implementations, the excimer laser uses a gas which comprises a single gas from or a combination of the following: F2, ArF, KrF, XeBr, XeCl and XeF.

In some implementations, the gas laser has a pulsed output or a continuous output.

In some implementations, the pulsed output has a repetition rate less than or equal to 2000 Hz.

In some implementations, the technique further includes monitoring additional factors that affect when the next gas refill should take place.

In some implementations, an AC power is applied to the gas laser continuously.

In some implementations, the technique automatically powers down the gas laser when the gas refill process is complete.

In some implementations, the technique automatically closes a gas supply valve of the gas supply when the gas refill process is complete.

In some implementations, an AC power is applied to the gas laser by means of a relay or other types of electronic actuator.

In some implementations, the automatic gas refill is performed by an integrated computer or an integrated controller of the gas laser.

In some implementations, the integrated computer or the integrated controller of the gas laser automatically monitors the need for gas refill and performs the gas refill process.

In some implementations, the automatic gas refill is performed by a computer or controller separated from the gas laser.

In some implementations, the separate computer or controller automatically monitors the need for gas refill and performs the gas refill process.

In some implementations, the gas supply is contained in a gas tank or a cylinder.

In some implementations, the gas supply can be opened or closed by means of a solenoid valve or other electronic actuator types.

In another aspect, a system that automatically performs a gas refill operation on a gas laser is described. This system includes: a computing device coupled to the gas laser; a gas supply external to and coupled to the gas laser to provide fresh gas to the gas laser; a gas supply valve coupled between a gas input of the gas laser and the gas supply; a power switch coupled between a power input of the gas laser and a power supply. The computing device of the system is operable to automatically: monitor a time elapsed since a last recorded gas refill; effectuate a gas refill process to refill the gas laser with gas from the gas supply by automatically controlling the gas supply valve and the power switch; and record a time stamp when the gas refill process is complete.

In some implementations, the computing device includes a computer or a controller.

DETAILED DESCRIPTION

Many excimer lasers include a mechanism to indicate when the gas being used becomes stale, at which time the operator initiates a gas refill procedure. For example, indicators of a stale gas condition can include showing a warning signal or message on a display or a computer monitor. Alternatively, the indicator can include a light, an alarm, or other visual or audible warning devices. When an operator implements a refill, the operator typically opens or closes one or more gas valves and actuates one or more solenoids, either manually or through software control. However, if power to the excimer laser is lost or turned off when the laser is not in use, the operator may not be notified of a stale gas condition. Consequently, it is desirable that the operator does not need to constantly monitor the status of the gas refill by directly viewing the monitor or display when refill indicators are provided. Moreover, it is desirable that the operator does not have to be physically present to effectuate a refill.

Disclosed are techniques, systems, and devices for performing an automatic gas refill of an unattended gas laser. In one aspect, a process for performing an automatic gas refill of a gas laser includes: monitoring a time elapsed since a last recorded gas refill; if a predetermined time interval is reached since the last recorded gas refill, effectuating a gas refill process to refill the gas laser with gas from a gas supply coupled to the gas laser by automatically controlling the gas laser and the gas supply; upon completing the gas refill process, recording a time stamp of the completed gas refill process. The automatic gas refill process may be controlled by a computer or computing device, with can be either integrated with the gas laser or external to the gas laser.

The predetermined time interval can be based on the number of shots fired, elapsed time or other metric and can be set by the laser manufacturer and/or operator. Once exceeded, the laser notifies the customer by means of email, text, Tweet or modality transmitted via the internet, local area network (LAN), telecommunication or other medium. The computer or the computing device can be configured to apply power to the laser and automatically perform a gas refill, unattended, and then log the date and time and continue to monitor the time interval until the next refill.

In one aspect, the disclosed technique is performed by a control program (such as software and/or firmware) that is operable to monitor and log the interval between gas refills, to alert the user when there is a need for gas refill, and to effectuate a refill via automatic control of the laser and gas supply. The control program may reside either within a computer or controller that is embedded with the laser or within a computer or computing device external to but coupled to the laser. The system and device may include relays or other automatic means for applying power to the laser and to start or stop the laser. The system and device may also include valve actuators and relays that are configured to remove the stale gas from the laser and replace with fresh gas from the laser gas supply without the assistance of the operator.

We now describe the detailed embodiments.

Figure 1:
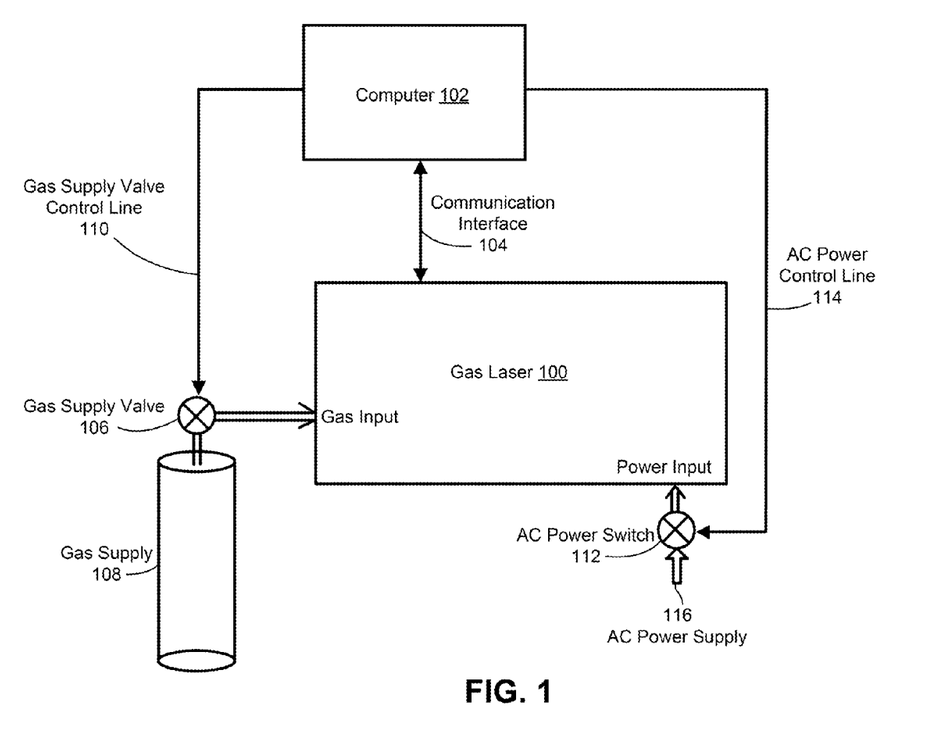
FIG. 1 illustrates a schematic of an automatic gas refill system in accordance with some embodiments described herein.

FIG. 1 illustrates a schematic of an automatic gas refill system in accordance with some embodiments described herein. The automatic gas refill system (also referred to as "gas refill system" or "system" hereinafter) may include a gas laser 100, such as a gas excimer laser or other types of gas lasers. The system also includes a computer 102 coupled to the gas laser 100, for example, through a communication interface 104. The communication interface 104 may wired or wireless. The computer 102 is configured to transmit a signal or a command through the communication interface 104 to the gas laser 100 to control various aspects of the gas laser 100. Note that computer 102 can include both an external computer separated from gas laser 100 and an embedded computer on the gas laser 100. The gas laser 100, such as a gas excimer laser, can include gas supply valves connected to a gas supply 108, and optionally a vacuum pump, all of which are operable together to let gas into and out of the gas laser 100 during a gas refill process. The gas laser 100 can have a pulsed output or a continuous output. If the laser has a pulsed output, the repetition rate may be less than or equal to 2000 Hz. In some implementations, the main valve (e.g., the main gas tank valve) of the gas supply remains open. Note that these gas supply valves can be standard components of the gas laser 100. In some embodiments, the system also includes a gas sensor to detect undesired gas leakage.

The system can include an additional gas supply valve 106 (or "gas valve 106"), which is coupled between the gas supply 108 and the gas input of the laser 100. The gas valve 106 is further coupled to the computer 102 through a gas supply valve control line 110. The gas supply valve control line 110 may be wired or wireless. In some implementations, the gas valve 106 can be controlled by the computer 102 to open and close the gas supply 108, thereby allowing or stopping the passage of gas from the gas supply 108 to the gas laser 100. The computer 102 is configured to transmit or otherwise send a signal or command to the gas valve 106 either wirelessly or through the gas supply valve control line 110 to control various operations of the gas valve 106 such that the computer 102 can open or close the gas supply 108 to the gas laser 100. Note that conventional gas lasers typically use a manual gas valve to open and close the gas supply, which requires the presence of an operator. The disclosed technology uses a computer-controlled gas valve, which does not require an operator to function. In some embodiments, the computer-controlled gas valve 106 is a solenoid valve, which can be an off-the-shelf unit or a custom designed unit. Note that the gas valve 106 can also be remotely controlled through the control line 110 by the computer 102 if the computer 102 is physically located at a remote location from the laser 100.

The laser 100 is powered by an energy source. In one aspect the energy source may be an electrical energy source in the form of an alternating current (AC) power supply 116. The system also includes an AC power switch 112 coupled between the AC power supply 116 of the gas laser 100 and the power input of the gas laser 100. The AC power switch 112 is further coupled to the computer 102 through an AC power control line 114, so that the computer 102 can turn on or turn off the AC power to the laser 100. The AC power control line 114 may be wired or wireless. The computer 102 is configured to transmit or otherwise send a signal or command to the AC power switch 112 either wirelessly or through the AC power control line 114 to control the operation of the AC power switch 112 such that the computer 102 can turn on or turn off the AC power to the laser 100. Note that conventional gas lasers typically use manual switches, such as a turn-key switch to turn on/off the AC power to the gas laser, which requires the present of an operator. The disclosed technology uses a computer-controlled AC power switch, which does not require an operator to function. Note that the AC power switch 112 can also be remotely controlled through the control line 114 by the computer 102 if the computer 102 is physically located at a remote location from the laser 100. Hence, by using both the computer-controlled gas supply valve 106 and the computer-controlled AC power switch 112, automatic gas refill of the laser 100 becomes possible without human intervention. We now describe the control program for automatic gas refill.

In some embodiments, the computer 102 has a memory that stores an auto-refill program that controls an automatic gas refill operation. The program may be stored in the memory in the form of executable instructions that when executed by a processor portion of the computer 102 cause the processor to perform the functions associated with the program as a Under the control of the auto-refill program (or "the program"), the proposed gas refill process is a completely automatic process that does not require operator intervention. Notably, the auto-refill program is operable to record the time of the laser's last refill with fresh gas and keep track of a maximum allowed time interval between refills. In some embodiments, the maximum allowed time interval is a dynamically set time interval that is determined based on a number of factors, which can include, but are not limited to: a usage metric from the last gas refill, such as the number of shots fired, elapsed time from the last gas fill, gas pressure, or other metrics. For example, the dynamically set time interval is usually longer in a situation where there is light use from the last gas fill versus a situation there is heavy use since last gas refill. Hence, the dynamically set time interval may be dynamically updated after each use of the laser 100, and a maximum time interval may be set when no use has occur since last gas refill. In some embodiments, rather than dynamically setting the maximum allowed time interval, the maximum allowed time interval is pre-set by the laser manufacturer and/or operator.

In some implementations, when the maximum allowed time interval is reached, the auto-refill program starts the auto-refill process by switching on AC power to the laser (if the power is currently off). In the example of FIG. 1, the program turns on the AC power by sending control signals through control line 114 to the AC power switch 112. The auto-refill program may provide control signals to relays or other switching mechanisms to apply power to the laser 100 and to start or stop the laser 100. After the laser 100 is powered on, the auto-refill process subsequently initiates a refill procedure which includes purging the stale gas contained within the laser 100 and replacing it with fresh gas.

More specifically, after the auto-refill process is started, a refill sequence is executed. This refill sequence typically includes: opening a purge-valve that is internal to the laser; activating the laser's vacuum pump to remove the stale gas from the laser; closing the purge-valve; and opening the laser's fill-valve to allow new gas to enter from the gas supply. Note that the operations of opening and closing the purge-valve, opening and closing the fill-valve, and turning on and off the vacuum pump may be controlled by an existing gas refill program on the laser separated from the auto-refill program, or they can be controlled by the auto-refill program itself.

Next, the auto-refill program sends control signals through a gas supply valve control line 110 to open a gas valve 106 of the gas supply 108 to allow the gas to flow from the gas supply 108 to the laser 100. As mentioned above, the auto-refill program may provide control signals through the gas supply valve control line 110 to an electromechanical gas valve 106, such as a solenoid valve, which is used to regulate the gas flow of the gas supply 108. After the laser 100 is filled with a predetermined amount of fresh gas, the laser's fill-valve 106 is closed either by an existing gas refill program on the laser or by the auto-refill program. The auto-refill program then sends control signals through the gas supply valve control line 110 to close the gas valve 106 to the gas supply 108 and switches off power to the laser 100 to complete the auto refill operation.

At this time, the computer 102 may record the date and time of the just completed gas fill and start to monitor the elapsed time toward the next refill. The auto refill process will be repeated when and if the elapsed time exceeds the maximum time interval.

Note that in the system of FIG. 1, the computer 102 that performs the auto refill operation can be a conventional computer that also performs that control functions of laser operation. In some implementations, a dedicated controller can be used to perform the auto refill operation.

Figure 2:
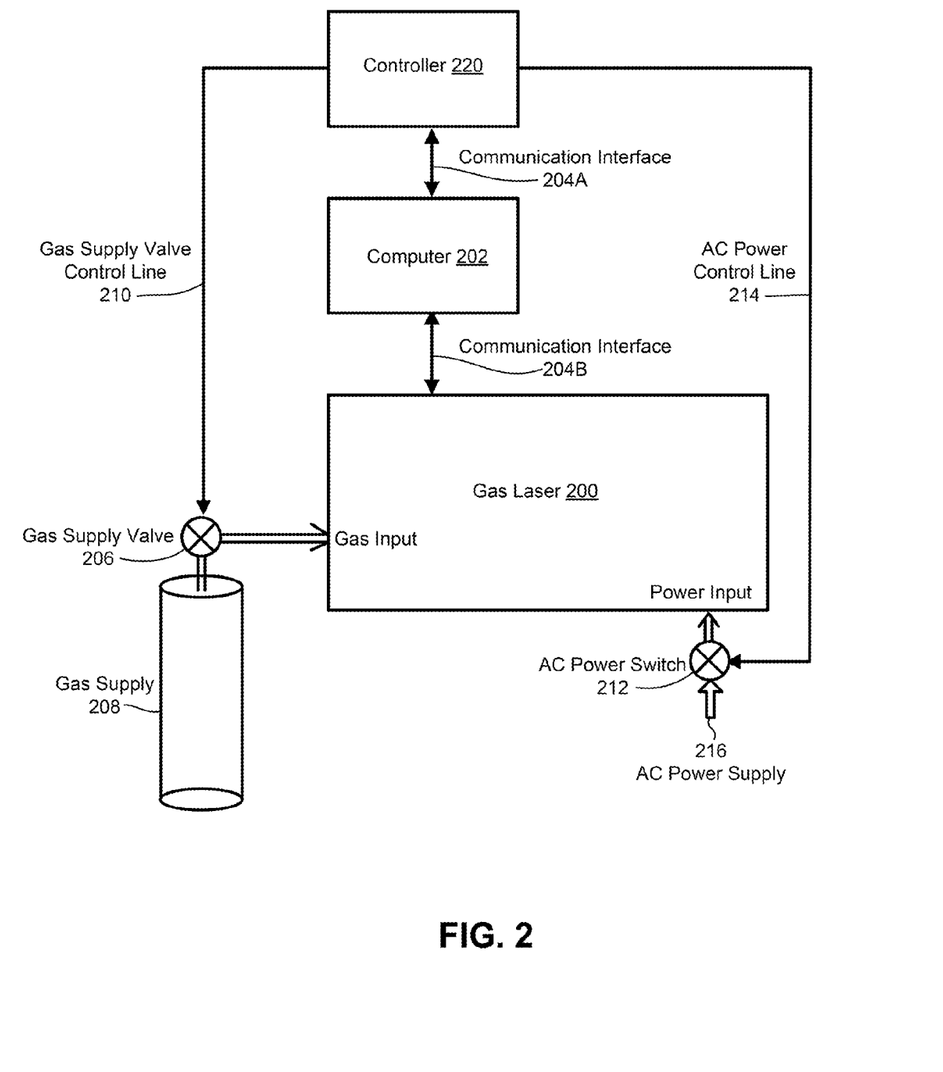
FIG. 2 illustrates an exemplary automatic gas refill system using a dedicated controller for auto-refill control in accordance with some embodiments described herein.

FIG. 2 illustrates an exemplary automatic gas refill system using a dedicated controller 220 for auto-refill control in accordance with some embodiments described herein. As can be seen in FIG. 2, the system includes a controller 220 which is coupled to gas laser 200 through a computer 202. The computer 202 can be a regular personal computer (PC) that controls conventional operations of the gas laser 200. In this implementation, the controller 220 directly controls auto gas refill procedure through a gas supply valve control line 210 which is coupled from the controller 220 to the gas supply valve 206 for turning on/off the gas supply valve 206. The controller 220 is configured to transmit or otherwise send a signal or command to the gas valve 206 either wirelessly or through the gas supply valve control line 210 to control various operations of the gas valve 206 such that the controller 220 can open or close the gas supply 208 to the gas laser 200. The laser 200 is powered by an energy source. In one aspect the energy source may be an electrical energy source in the form of an AC power supply 216. An AC power control line 214 is coupled from the controller 220 to an AC power switch 212 to turn on/off the AC power from the AC power supply 216 to the laser 200 according to the auto refill program. The controller 220 is configured to transmit or otherwise send a signal or command to the AC power switch 212 either wirelessly or through the AC power control line 214 to control the operation of the AC power switch 212 such that the controller 220 can turn on/off the AC power from the AC power supply 216 to the laser 200 according to the auto refill program. The controller 220 may also control a laser's purge-valve, vacuum pump, and fill-valve to perform the above-described operations. In some implementations, the auto-refill program resides on the controller 220, which when executed by the controller 220, generates control signals to control standard gas refill steps on the laser 200 through a first communication interface 204A and a second communication interface 204B. The computer 202 is configured to transmit a signal or a command through the second communication interface 204B to the gas laser 200 to control various aspects of the gas laser 200. In some implementations, the auto-refill program can reside on both the controller 220 and the computer 202. In some implementations, while the controller 220 directly controls the gas supply valve 206 and the AC power switch 212 during the auto-gas refill operation, the computer 202 can control the standard steps of the gas refill operations involving purging stale gas and opening and closing the purge-valve and the fill-valve. The first and second communication interfaces 204A, 204B, the gas supply valve control line 210, and/or the AC power control line 214 may be either wired or wireless or combinations thereof.

Figure 3:
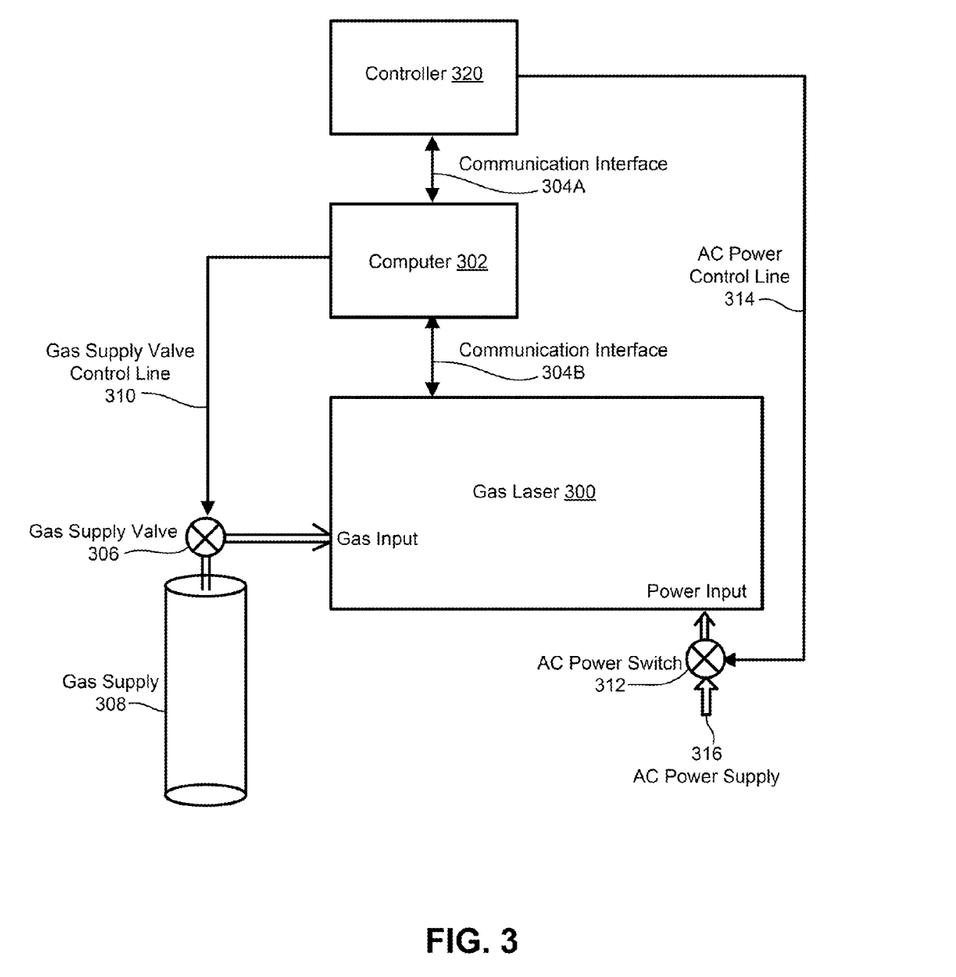
FIG. 3 illustrates another exemplary automatic gas refill system using a dedicated controller for auto-refill control in accordance with some embodiments described herein.

FIG. 3 illustrates another exemplary automatic gas refill system using a dedicated controller 320 for auto-refill control in accordance with some embodiments described herein. As can be seen in FIG. 3, the system includes a controller 320 which is coupled to a gas laser 300 through a computer 302.

The computer 302 can be a regular PC that controls conventional operations of the gas laser 300. The laser 300 is powered by an energy source. In one aspect the energy source may be an electrical energy source in the form of an AC power supply 316. In the implementation of FIG. 3, the controller 320 directly controls the AC power during the auto gas refill procedure through an AC power control line 314 from the controller 320 to an AC power switch 312 to turn on/off the AC power from the AC power supply 316 to the laser 300 according to the auto refill program. The controller 320 is configured to transmit or otherwise send a signal or command to the AC power switch 312 either wirelessly or through the AC power control line 314 to control the operation of the AC power switch 312, such that the controller 320 can turn on/off the AC power from the AC power supply 316 to the laser 300 according to the auto refill program. The computer 302 directly controls the gas supply valve 306 during auto gas refill procedure through a gas supply valve control line 310 which is coupled between the computer 302 and the gas supply valve 306 to turn on/off the gas supply valve 306 according to the auto refill program. The computer 302 is configured to transmit or otherwise send a signal or command to the gas valve 306 either wirelessly or through the gas supply valve control line 310 to control various operations of the gas valve 306 such that the computer 302 can open or close the gas supply 308 to the gas laser 300. In some implementations, the auto-refill program resides on one of the controller 320 and the computer 302, which when executed by either the controller 320 or the computer 302, generates control signals to control standard gas refill steps on the laser 300 through a first communication interface 304A and a second communication interface 304B. The computer 302 is configured to transmit a signal or a command through the second communication interface 304B to the gas laser 300 to control various aspects of the gas laser 300. In some implementations, the auto-refill program can reside on both the controller 320 and the computer 302. In some implementations, while the controller 320 directly controls the AC power switch 312 during the auto-gas refill operation, the computer 302 directly controls the operation of the gas supply valve 306, and the standard steps of the gas refill operations involving purging stale gas and opening and closing the purge-valve and fill-valve. The first and second communication interfaces 304A, 304B, the gas supply valve control line 310, and/or the AC power control line 314 may be either wired or wireless or combinations thereof.

Figure 4:
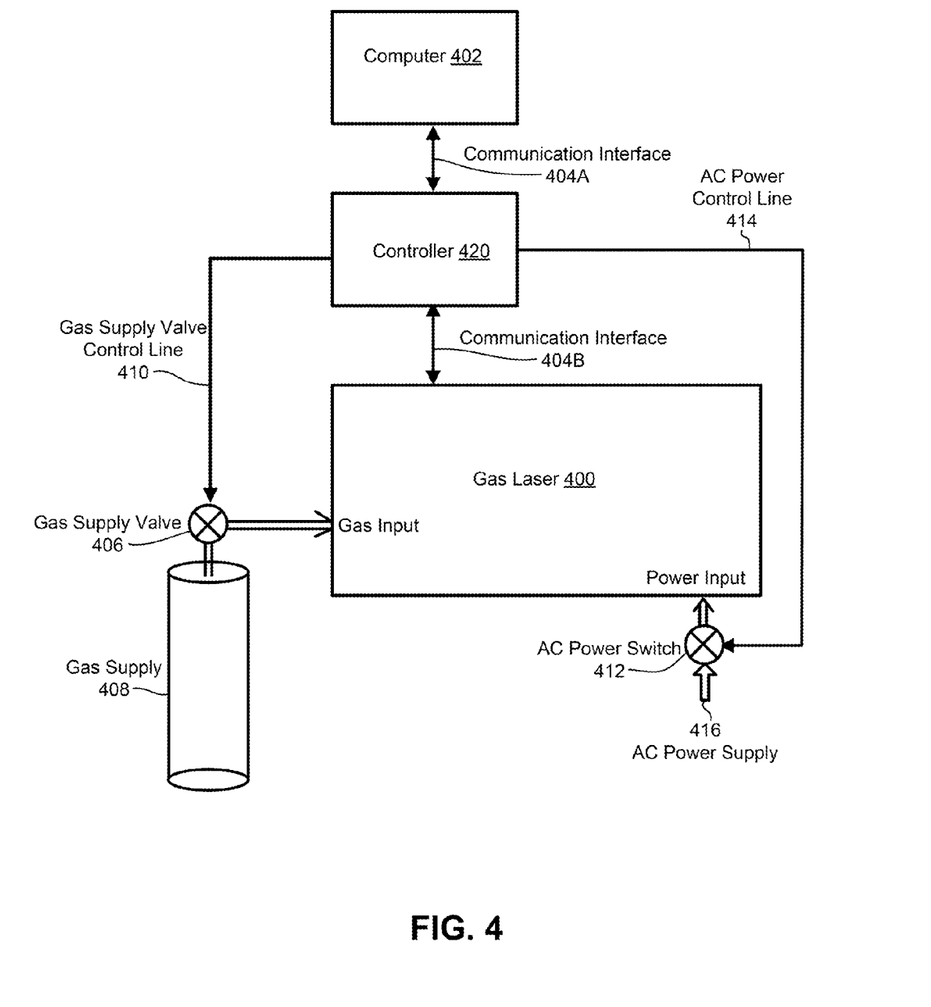
FIG. 4 illustrates yet another exemplary automatic gas refill system using a dedicated controller for auto-refill control in accordance with some embodiments described herein.

FIG. 4 illustrates yet another exemplary automatic gas refill system using a dedicated controller 420 for auto-refill control in accordance with some embodiments described herein. As can be seen in FIG. 4, the system includes a controller 420 which is directly coupled to a gas laser 400 through a second communication interface 404B. The computer 402 is coupled to the controller 420 and the laser 400 through a first communication interface 404A and the second communication interface 404B. The computer 402 can include a regular PC that controls conventional operations of the gas laser 400. The controller 420 is configured to transmit a signal or a command through the second communication interface 404B to the gas laser 400 to control various aspects of the gas laser 400. In this implementation, the controller 420 directly controls auto gas refill procedure through a gas supply valve control line 410 which is coupled from the controller 420 to a gas supply valve 406 for turning on/off the gas supply valve. The controller 420 is configured to transmit or otherwise send a signal or command to the gas valve 406 either wirelessly or through the gas supply valve control line 410 to control various operations of the gas valve 406 such that the controller 420 can open or close the gas supply 408 to the gas laser 400. The laser 400 is powered by an energy source. In one aspect the energy source may be an electrical energy source in the form of an AC power supply 416. An AC power control line 414 is coupled from the controller 420 to an AC power switch 412 to turn on/off the AC power from the AC power supply 416 to the laser 400 according to the auto refill program. The controller 420 is configured to transmit or otherwise send a signal or a command to the AC power switch 412 either wirelessly or through the AC power control line 414 to control the operation of the AC power switch 412 such that the controller can turn on/off the AC power from the AC power supply 416 to the laser 400 according to the auto refill program. The controller 420 may also control the laser's purge-valve, vacuum pump, and fill-valve to perform the above-described operations. In some implementations, the auto-refill program resides on the controller 420, which when executed by the controller 420, generates control signals to control the auto gas refill procedure on the laser 400 through the second communication interface 404B. In some implementations, the auto-refill program may reside on the computer 402. In these implementations, the computer 402 may initiate the auto-refill procedure on the controller 420 through the first commutation interface 404A. The first and second communication interfaces 404A, 404B, the gas supply valve control line 410, and/or the AC power control line 414 may be either wired or wireless or combinations thereof.

Figure 5:
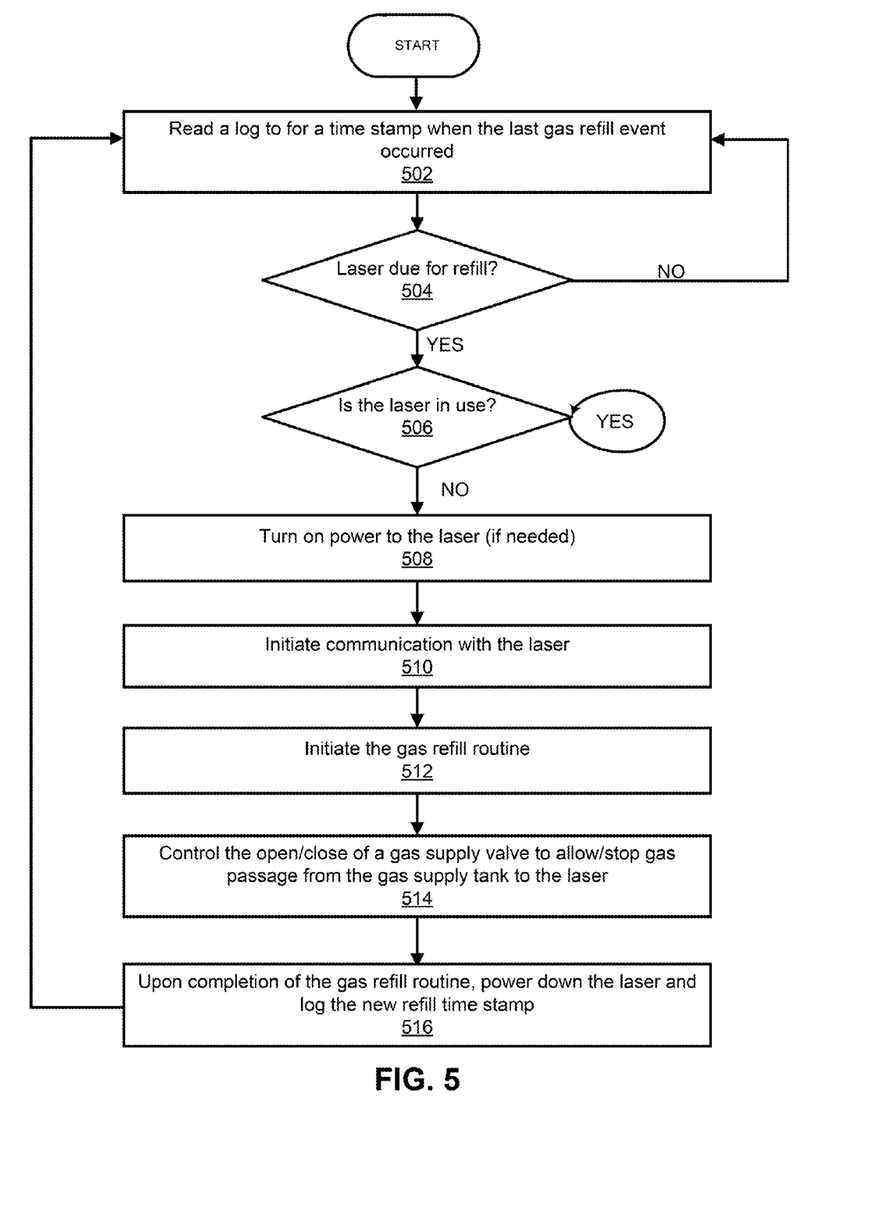
FIG. 5 presents a flowchart illustrating a process of performing an automatic gas refill on a gas laser in accordance with some embodiments described herein.

FIG. 5 presents a flowchart illustrating a process of performing an automatic gas refill on a gas laser in accordance with some embodiments described herein. The process may read a log for a time stamp (e.g., time and date) when the last gas refill event occurred (502). The last refill event may be either logged manually by a user through a software or logged automatically by the auto refill program. The process then determines when if the gas laser is due for the next refill (504). For example, the process can determine when a recommended time interval between refills is reached, which is one of the reason for performing a refill. The program may also receive information from a gas leak sensor which monitors gas leak. The process may also use information of laser usage since the last refill as a factor for determining when the next refill is due. If the process determines that the next refill is not yet due, the program continues to monitor the above described refill conditions.

When the process determines that the next refill is due, e.g., the recommended time interval is reached, the process then checks to see if the laser is in use or not (506). If the laser is in use, the process then waits until the laser is no longer in use. If the laser is not or no longer in use, the process then turns on power to the laser (if needed) (508). For example, the process may apply the AC power to the laser through a remote-controlled relay or other types of remote-controlled power switches. At this time, the process may optionally notify a user and/or manufacturer of the need to refill by means of posting an alert on an computer monitor, sending an email or txt message, and/or via other notification means. The program then initiates communication with the laser, e.g., by initializing an communication interface (510). The process next initiates the gas refill routine (512). This step may include open additional programs.

During the execution of the gas refill routine, the process also controls the open/close of a gas supply valve to allow/stop gas passage from the gas supply tank to the laser (514). For example, the process may open/close a remote-controlled solenoid valve coupled to the gas supply tank. Upon completion of the gas refill routine, the process powers down the laser and logs the new refill time stamp (e.g., time and date) (516). The process then returns to (502) to continue the process.

Implementations of the subject matter and the functional operations described in this patent document can be implemented in various systems, digital electronic circuitry, or in computer software, firmware, or hardware, including the structures disclosed in this specification and their structural equivalents, or in combinations of one or more of them. Implementations of the subject matter described in this specification can be implemented as one or more computer program products, i.e., one or more modules of computer program instructions encoded on a tangible and non-transitory computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of nonvolatile memory, media and memory devices, including by way of example semiconductor memory devices, e.g., EPROM, EEPROM, and flash memory devices. The processor and the memory can be supplemented by, or incorporated in, special purpose logic circuitry.

While this patent document and attached appendices contain many specifics, these should not be construed as limitations on the scope of any invention or of what may be claimed, but rather as descriptions of features that may be specific to particular embodiments of particular inventions. Certain features that are described in this patent document and attached appendices in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document and attached appendices should not be understood as requiring such separation in all embodiments.

Only a few implementations and examples are described and other implementations, enhancements and variations can be made based on what is described and illustrated in this patent document and attached appendix.

1. In various aspects, the present disclosure provides a method for performing an automatic gas refill of a gas laser, comprising: monitoring a time elapsed since a last recorded gas refill; if a predetermined time interval is reached since the last recorded gas refill, effectuating a gas refill process to refill the gas laser with gas from a gas supply coupled to the gas laser by automatically controlling the gas laser and the gas supply; and upon completing the gas refill process, recording a time stamp of the completed gas refill process.

2. In one aspect, the present disclosure provides the method of clause 1, wherein effectuating the gas refill process by automatically controlling the gas laser and the gas supply involves powering up the gas laser by electrically turning on an AC power switch.

3. In one aspect, the present disclosure provides the method of clause 1, wherein effectuating the gas refill process by automatically controlling the gas laser and the gas supply involves opening a gas supply valve coupled to the gas supply to allow passage of gas from the gas supply to the gas laser.

4. In one aspect, the present disclosure provides the method of clause 1, wherein effectuating the gas refill process through automatic controls of the gas laser and the gas supply involves initiating a gas refill routine which includes purging stale gas from the gas laser and filling fresh gas from the gas supply into the gas laser.

5. In one aspect, the present disclosure provides the method of clause 1, wherein the gas laser is coupled to the gas supply external to the gas laser through one or more gas valves and one or more gas tubes.

6. In one aspect, the present disclosure provides the method of clause 1, wherein the gas laser is an excimer laser.

7. In one aspect, the present disclosure provides the method of clause 6, wherein the excimer laser uses a gas which comprises a single gas from or a combination of the following: F2, ArF, KrF, XeBr, XeCl and XeF.

8. In one aspect, the present disclosure provides the method of clause 1, wherein the gas laser has a pulsed output or a continuous output.

9. In one aspect, the present disclosure provides the method of clause 8, wherein the pulsed output has a repetition rate less than or equal to 2000 Hz.

10. In one aspect, the present disclosure provides the method of clause 1, wherein the method includes monitoring additional factors that affect when the next gas refill should take place.

11. In one aspect, the present disclosure provides the method of clause 1, wherein an AC power is applied to the gas laser continuously.

12. In one aspect, the present disclosure provides the method of clause 1, wherein the method further includes automatically powering down the gas laser when the gas refill process is complete.

13. In one aspect, the present disclosure provides the method of clause 1, wherein an AC power is applied to the gas laser by means of a relay or other types of electronic actuator.

14. In one aspect, the present disclosure provides the method of clause 1, wherein the method further includes automatically closing a gas supply valve of the gas supply when the gas refill process is complete.

15. In one aspect, the present disclosure provides the method of clause 1, wherein the automatic gas refill is performed by an integrated computer or an integrated controller of the gas laser.

16. In one aspect, the present disclosure provides the method of clause 15, wherein the integrated computer or the integrated controller of the gas laser automatically monitors the need to refill and performs the gas refill process.

17. In one aspect, the present disclosure provides the method of clause 1, wherein the automatic gas refill is performed by a computer or controller separated from the gas laser.

18. In one aspect, the present disclosure provides the method of clause 17, wherein the separate computer or controller automatically monitors the need to refill and performs the gas refill process.

19. In one aspect, the present disclosure provides the method of clause 1, wherein the gas supply is contained in a gas tank or a cylinder.

20. In one aspect, the present disclosure provides the method of clause 1, wherein the gas supply can be opened or closed by means of a solenoid valve or other electronic actuator types.

What is claimed is:

1. An apparatus to automatically refill a gas laser, the apparatus comprising:
a computing device coupled to a memory, the memory storing instructions that when executed by the computing device cause the computing device to:
monitor a time elapsed since a last recorded gas refill;
when a predetermined time interval is reached since the last recorded gas refill compared to the predetermined time interval from a first time stamp, effectuate a gas refill process to refill the gas laser with gas from a gas supply coupled to the gas laser by automatically controlling the gas laser and the gas supply; and
upon completing the gas refill process, record a second time stamp of the completed gas refill process; and
wherein the predetermined time interval is based on an amount of time for the gas from the gas supply used in the gas refill to become stale and wherein the predetermined time interval is independent of an use of the gas laser.

2. The apparatus of claim 1, wherein to effectuate the gas refill process by automatically controlling the gas laser and the gas supply, the instructions when executed by the computing device cause the computing device to power up the gas laser by electrically turning on an AC power switch.

3. The apparatus of claim 1, wherein to effectuate the gas refill process by automatically controlling the gas laser and the gas supply, the instructions when executed by the computing device cause the computing device to open a gas supply valve coupled to the gas supply to allow passage of gas from the gas supply to the gas laser.

4. The apparatus of claim 1, wherein to effectuate the gas refill process through automatic controls of the gas laser and the gas supply, the instructions when executed by the computing device cause the computing device to initiate a gas refill routine which includes purging stale gas from the gas laser and filling fresh gas from the gas supply into the gas laser.

5. The apparatus of claim 1, wherein the instructions when executed by the computing device cause the computing device to monitor additional factors that affect when a next gas refill should take place.

6. The apparatus of claim 1, wherein the instructions when executed by the computing device cause the computing device to transmit a signal or a command to the gas laser to automatically power down the gas laser when the gas refill process is complete.

7. The apparatus of claim 1, wherein the instructions when executed by the computing device cause the computing device to automatically close a gas supply valve of the gas supply when the gas refill process is complete.

8. The apparatus of claim 1, wherein the computing device is a computer or a controller integrated with the gas laser.

9. The apparatus of claim 8, wherein the integrated computer or the integrated controller of the gas laser is configured to automatically monitor the time elapsed and performs the gas refill process when the instructions are executed by the integrated computer or the integrated controller of the gas laser.

10. The apparatus of claim 1, wherein the computing device is a computer or controller that is separate from the gas laser.

11. The apparatus of claim 10, wherein the separate computer or controller is configured to automatically monitor the time elapsed and performs the gas refill process when the instructions are executed by the separate computer or the separate controller of the gas laser.

12. An apparatus to automatically refill a gas laser, the apparatus comprising:
a computing device coupled to a memory, the memory storing instructions that when executed by the computing device cause the computing device to:
monitor a time elapsed since a last recorded gas refill;
when a predetermined time interval is reached since the last recorded gas refill compared to the predetermined time interval from a first time stamp, effectuate a gas refill process to refill the gas laser with gas from a gas supply coupled to the gas laser by automatically controlling the gas laser and the gas supply; and
upon completing the gas refill process, record a second time stamp of the completed gas refill process; and
a gas laser is coupled to the computing device, wherein the gas laser is configured to receive gas from the gas supply located external to the gas laser through one or more gas valves and one or more gas tubes; and wherein the predetermined time interval is based on an amount of time for the gas from the gas supply used in the gas refill to become stale and wherein the predetermined time interval is independent of an use of the gas laser.

13. The apparatus of claim 12, wherein the gas laser is an excimer laser.

14. The apparatus of claim 13, wherein the excimer laser uses a gas which comprises a single gas from or a combination of the following: F2, ArF, KrF, XeBr, XeCl and XeF.

15. The apparatus of claim 12, wherein the gas laser comprises a pulsed output or a continuous output.

16. The apparatus of claim 15, wherein the pulsed output has a repetition rate less than or equal to 2000 Hz.

17. The apparatus of claim 12, wherein the gas laser is configured to couple to an alternating current (AC) power supply and the laser is configured to be powered continuously by the AC power supply.

18. The apparatus of claim 17, wherein the gas laser is configured to couple to the AC power supply through an electronic actuator.

19. The apparatus of claim 18, wherein the electronic actuator comprises a relay.

20. The apparatus of claim 12, wherein the computing device is configured to transmit a signal or command to an electronic actuator to open or close the actuator and fluidically couple the gas supply to the gas laser.

21. The apparatus of claim 20, wherein the electronic actuator comprises a solenoid valve.

22. A system that automatically performs a gas refill operation on a gas laser, comprising:
　a computing device coupled to the gas laser;
　a gas supply external to and coupled to the gas laser to provide fresh gas to the gas laser;
　a gas supply valve coupled between a gas input of the gas laser and the gas supply;
　a power switch coupled between a power input of the gas laser and a power supply;
　wherein the computing device is operable to automatically:
　　monitor a time elapsed since a last recorded gas refill;
　　effectuate a gas refill process to refill the gas laser with gas from the gas supply by automatically controlling the gas supply valve and the power switch, wherein the gas refill process is effectuated upon reaching a predetermined time interval since the last recorded gas refill compared to the predetermined time interval from a first time stamp; and
　　record a second time stamp when the gas refill process is complete; and
　wherein the predetermined time interval is based on an amount of time for the gas from the gas supply used in the gas refill to become stale and wherein the predetermined time interval is independent of an use of the gas laser.

23. The system of claim 22, wherein the computing device includes a computer or a controller.

* * * * *